United States Patent [19]
Powell

[11] 4,224,545
[45] Sep. 23, 1980

[54] SPEED CONTROL

[75] Inventor: Brian W. Powell, Ashton-under-Lyne, England

[73] Assignee: Ferranti Limited, Hollinwood, England

[21] Appl. No.: 930,220

[22] Filed: Aug. 2, 1978

[30] Foreign Application Priority Data

Aug. 27, 1977 [GB] United Kingdom ............... 36107/77

[51] Int. Cl.$^2$ .......................................... H02K 49/02
[52] U.S. Cl. ..................................... 310/93; 310/94; 310/105
[58] Field of Search ...................... 310/92, 93, 94, 95, 310/96, 105, 103; 185/37

[56] References Cited

U.S. PATENT DOCUMENTS

| 1,862,267 | 7/1932 | Honig | 310/94 X |
| 2,909,683 | 10/1959 | Holzer | 310/93 |
| 3,256,823 | 6/1966 | Keyes | 310/105 X |

Primary Examiner—Donovan F. Duggan
Attorney, Agent, or Firm—Kerkam, Stowell, Kondracki & Clarke

[57] ABSTRACT

A speed control arrangement for a rotatable member driven by an energy source, such as a spring, whose driving torque can vary consists of an eddy current brake comprising an eddy current rotor driven with the rotatable member and a magnetic circuit coupled to the rotor to exert a braking effect. The magnetic circuit is carried by an arm movable relative to the rotor by unwinding of the spring (or other change in torque) to alter the coupling, and the braking effect, as the torque exerted by the energy source varies.

12 Claims, 4 Drawing Figures

SPEED CONTROL

This invention relates to speed control arrangements and in particular to such arrangements for controlling the speed of a rotatable member, driven from an energy source, to compensate for changes in driving torque supplied by the energy source.

It is frequently desired to maintain a constant speed of a rotatable member, for instance in one gear of a gear train, when a time interval is to be measured by reference to a predetermined angular rotation of the gear. When the gear train is driven from an energy source such as a wound spiral spring the torque applied to the gear train varies continuously as the energy is released from the spring requiring the use of a speed control or regulator which has traditionally taken the form of an oscillating escapement. Such escapement mechanisms may suffer disadvantages in that they may not be self-starting, may be sensitive to driving torque changes, or sensitive both to temperature and to mechanical disturbances, making operation in extreme conditions unreliable. A rotatable member may be driven by a motor producing a nominally constant driving torque but which may be variable in response to variations in supplies to the motor. Speed control in these circumstances has usually involved elaborate control of the motor supply adding to the complexity size and cost of apparatus of which it is part.

It is an object of the present invention to provide a speed control arrangement of simple construction for control of a rotatable member driven from an energy source, which arrangement mitigates some or all of the above disadvantages.

According to the present invention a speed control arrangement for a rotatable member driven from an energy source includes an eddy current brake comprising a rotor of electrically conductive material coupled to the rotatable member to be driven therewith, a magnetic circuit including a magnet and arranged to be coupled to the rotor such that the rotation of the rotor causes eddy currents to be induced in the rotor material to produce a braking torque against its rotation and actuation means responsive to a change in driving torque applied to the rotatable member by the energy source to alter the coupling between the magnetic circuit and the rotor to produce a change in the braking torque on the rotor corresponding to the change in driving torque.

The magnetic circuit may comprise a permanent magnet attached to a substantially U-shaped magnetic shunt member such that an air gap exists between the limbs of the member. A portion of the rotor extends into the magnetic field of the air gap to effect said magnetic coupling.

The energy source may be a spiral spring caused to unwind to apply a driving torque to the rotatable member. The rotatable member may be coupled to the energy source by a gear train. If, for instance, a gear train is employed, one end of the spring may be coupled to a shaft of one gear of the train, the other end of the spring being connected to an arm carrying the magnetic circuit to form the actuation means such that as the spring is wound the arm is moved radially with respect to the rotor to increase the magnetic coupling with the rotor and as the spring is unwound the arm is moved in the opposite sense to decrease the coupling. The arm may be pivotable about the shaft of the gear driven by the energy source spring.

Alternatively the energy source may be a motor, the rotor thereof being coupled to the rotatable member and the magnetic circuit being coupled by the actuation means to the stator such that any change in motor torque causing a reaction on the stator causes a change in the magnetic coupling between the magnetic circuit and the eddy current rotor to effect a corresponding change in the braking torque on the rotatable member.

The eddy current brake may include a plurality of movable magnetic circuits and/or a plurality of magnetic circuits fixed relative to the rotor.

The shunt member of the, or each, magnetic circuit may be shaped such that the relationship between braking torque and magnetic coupling varies in the same way as the relationship between the change of torque of the energy source and movement of the magnetic circuit.

The speed control arrangement may be used in a timing mechanism and embodiments of the invention in timing mechanism will now be described by way of example with reference to the accompanying drawings, in which.

Figure 1:
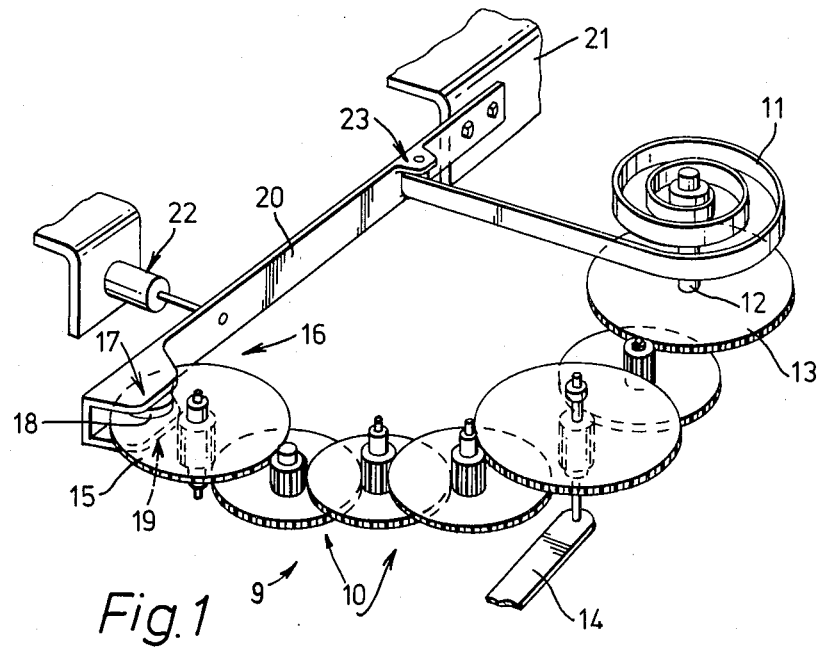
FIG. 1 is a perspective view of a timing mechanism including a gear train driven by a spiral spring and incorporating a speed control arrangement according to the present invention.

Referring to FIG. 1, a timing mechanism 9 includes a gear train 10 driven by a spirally coiled spring 11 connected to a shaft 12 about which one gear 13 of the train rotates. The gear train is coupled to drive an external device such as a hand 14 of the timing mechanism and also to a rotor, in the form of a disc 15, of an eddy-current brake 16. The disc is of metal of suitable reluctance and conductivity and is arranged to rotate within a predetermined speed range over the useful driving torque range of the spring. The eddy-current brake also includes a magnetic circuit 17 comprising a permanent magnet 18 and a substantially U-shaped shunt member 19. The magnet is attached to one of the limbs of the member leaving an air-gap between the magnet and the other limb through which air-gap a portion of the disc 15 can pass.

The U-shaped member of the magnetic circuit is formed integrally with a beam 20 of spring material fixed to a frame 21 of the timing mechanism. The beam is prevented from oscillating by a damping arrangement 22. The beam 20 also forms at 23 an anchor for the other end of the spiral spring 12 and thus actuation means for varying the coupling between the magnetic circuit and the disc.

With an eddy-current brake as described at 16, when the disc 15 is rotating maximum braking occurs when the magnet 18 lies adjacent the periphery of the disc and that braking torque falls as the magnet is moved towards the centre of the disc and also falls as the magnet is moved away from the disc and less of the disc enters the air-gap. The length of the spring 11 and the anchor points 23 and the resilience of the beam are chosen so that with the spring 11 fully wound the spring pulls on the anchor point 23 and deflects the beam 21 so that the magnet 18 overlies the periphery of the disc 15 at the position to effect maximum braking torque.

When the spring 11 is allowed to release energy, the anchor 23 restrains one end and the other end applies a torque to shaft 13 which causes the gears of the train to rotate. The disc 15 is also caused to rotate and the magnetic circuit applies maximum braking torque to coincide with maximum driving torque from the fully wound spring. As the spring unwinds and the driving torque for the gear train falls so the pull on the beam decreases and the magnetic circuit is allowed to move away from the disc 15 by the resilience of the beam 20. Thus for a considerable change in driving torque a corresponding change in braking torque ensures that the gear train runs at a constant speed.

Figure 2:
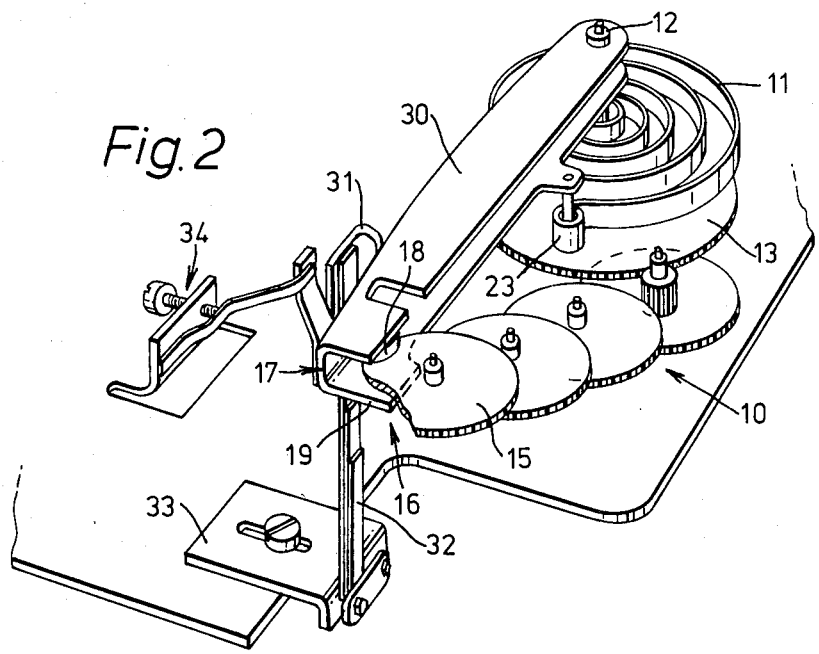
FIG. 2 is a perspective view of a timing mechanism incorporating an alternative arrangement of speed control.

A more compact speed control arrangement is shown in FIG. 2 in which features corresponding to those of FIG. 1 are given like reference numerals.

The magnetic circuit 16 is carried by a rigid arm 30 which is pivotally mounted on the shaft 12. The arm 30 also carries an anchor point 23 to which the outer end of the spiral spring 11 is connected. The arm 30 also carries a hooked portion 31 which contacts a leaf spring 32 attached to a frame of the timing mechanism by an adjustable bracket 33. As the spring 11 is wound onto the shaft 12 the outer end of the spring, at 23, pulls the arm 30 anticlockwise as shown in the Figure against the resilience of the leaf spring 32 to position the air-gap with respect to the disc 15 to provide maximum braking torque when the spring 11 is released. As the spring unwinds and drives the shaft 12, the pull on the anchor point 23 is relaxed and the arm is moved in a clockwise sense by leaf spring 32 to decrease the coupling between the magnetic circuit and the disc. The coupling achieved when the spring 11 is fully wound may be altered by altering the deflection of the leaf spring 32 by repositioning the bracket 33. To ensure that the magnetic circuit is operated only to decrease from a maximum braking value when the spring 11 is fully wound a stop 34 is provided to prevent the arm 30 from being moved clockwise beyond the position at which maximum braking torque is exerted.

Figure 3:
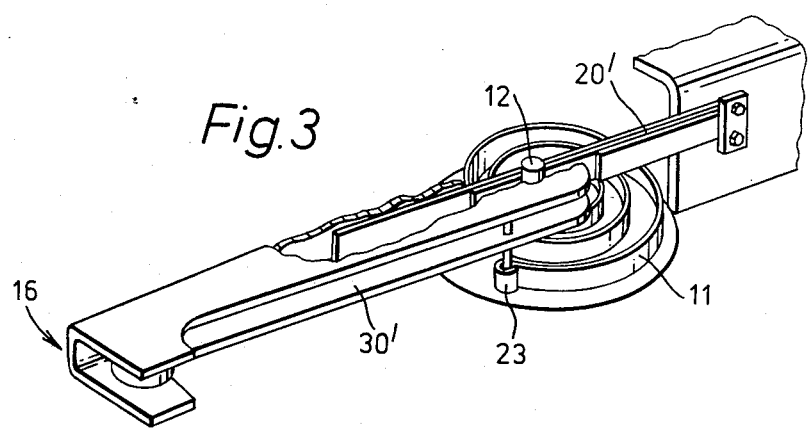
FIG. 3 shows modified form of the magnetic circuit in the speed control arrangement of FIG. 2.

Features of the embodiments of FIGS. 1 and 2, are combined in a further embodiment of a speed control arrangement shown in FIG. 3. A rigid arm 30′ carrying the magnetic circuit 16 is pivotally mounted on a gear shaft 12, which shaft carries a spiral spring 11 connected at its inner end to the shaft and at its outer end to an anchor point 23 on the arm. The arm is biased away from the brake disc (now shown) by means of a leaf spring 20′ similar to that shown in FIG. 1 but attached to the frame of the timing mechanism so as to extend along the arm 30′ adjacent its pivot point. The arrangement operates in the same manner as that of FIG. 2 but the relocation of the spring 20′ results in a more compact arrangement.

Figure 4:
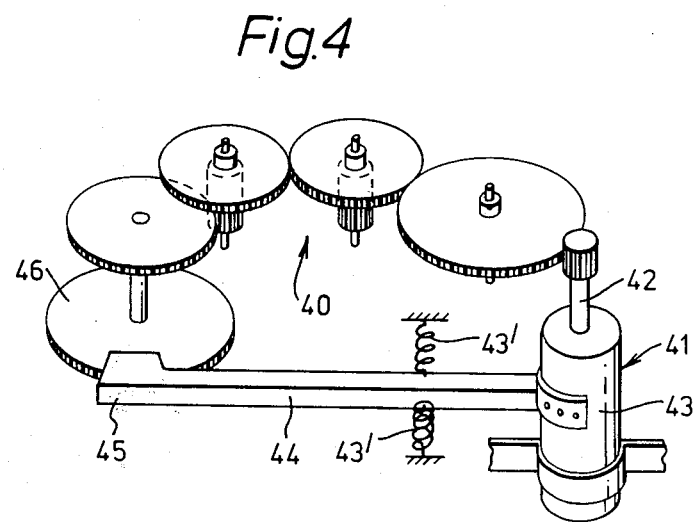
FIG. 4 is a perspective view of a timing mechanism in which a gear train is driven by an electric motor and including a speed control arrangement also according to the present invention.

The magnetic circuit of FIG. 3 is shown with the shunt member having non-parallel, that is, curved, limbs. The curvature may be determined for a particular material used as the disc and arranged to match any non-linear decay of braking torque. The shape of the magnetic shunt is of course chosen in the same way for the embodiments of FIGS. 1 and 2 and for an alternative embodiment now to be described with reference to FIG. 4.

A gear train 40 from which it is desired to produce a constant speed output is driven by the rotor of a motor 41 by way of a shaft 42. The motor body 43, carrying the stator, is carried by a framework of apparatus of which it is a part such that it has at least limited motion relative to the framework about the axis of rotation of the shaft 42 against a restoring bias provided by spring 43′, or the like. The body also has fixed thereto an arm 44 extending substantially radially of the body and carrying at the end remote from the body a magnetic circuit 45. The magnetic circuit contains an air-gap (not shown) into which extends a portion of a metal disc 46 driven by the gear train.

It is intended that the gear train be driven at a constant speed by the motor 41 producing a constant torque. The motor is arranged to provide a torque in excess of that required to drive the gear train with any final load and the magnetic brake is arranged to absorb the torque above that required by positioning the magnetic circuit with respect to the disc to be intermediate the positions effecting maximum and minimum braking. Any change in torque required of the motor by loading or caused by fluctuation in motor supply will be integrated out by compensation within the motor but not before an instantaneous change in output torque has occurred. With the braking arrangement of the present invention any change in motor torque, for instance, an increase, results in a reaction on the stator causing the motor body to rotate relative to the framework and move the magnetic circuit towards the disc to produce a corresponding increase in braking torque followed by a return to the equilibrium position. The motor may be other than electric, for example, hydraulic, or may be a tensator motor in which energy is provided by the transfer of a spiral spring, coiled in a stressed reverse sense on one spindle, into a coiled unstressed state on an adjacent spindle.

It will be appreciated that the disc may be formed of any material suitable for having eddy-currents induced therein and preferably one in which the change of reluctance with temperature offsets its change in conductivity with temperature; and the magnetic circuits may be given configurations and dimensions calculated to provide a desired change in braking torque with movement at the actuation means caused by change in driving torque.

The gear train or any other coupling means such as a belt or chain may be used for driving any load requiring a constant output speed, such as the clock mechanism described, in which a predetermined angular rotation of one gear of the train at a constant speed represents the passage of a predetermined time interval. The speed control arrangement as described in the above embodiments will provide a range of braking torques of a given range of disc speeds. For greater control a plurality of discs each with a movable magnetic circuit may be coupled to be driven by the same or different gears or the, or each, disc may be provided with a fixed magnetic circuit to define a range of speed values over which the movable magnetic circuit can effect speed control.

What I claim is:

1. A speed control arrangement for a rotatable member driven from an energy source the speed control arrangement including an eddy current brake comprising a rotor of electrically conductive material coupled to the rotatable member to be driven therewith, a magnetic circuit including a magnet and arranged to be coupled to the rotor such that rotation of the rotor causes eddy currents to be induced in the rotor material to produce a braking torque against its rotation and actuation means responsive to a change in driving torque applied to the rotatable member by the energy source to alter the coupling between the magnetic circuit and the rotor to produce a change in the braking torque on the rotor corresponding to the change in driving torque.

2. A speed control arrangement as claimed in claim 1 in which the magnetic circuit comprises a permanent magnet attached to a substantially U-shaped magnetic shunt member such that an air-gap exists between the limbs of the member.

3. A speed control arrangement as claimed in claim 1, or claim 2, in which the energy source is a spiral spring operable to unwind to apply a driving torque to the rotatable member by way of a gear train coupled to one end of the spring the actuation means comprising the other end of the spring connected to the magnetic circuit such that winding of the spring moves the magnetic circuit radially with respect to the rotor to increase the magnetic coupling with the rotor and unwinding of the spring causes moving of the magnetic circuit to decrease the coupling.

4. A speed control arrangement for a rotatable member driven from an energy source the speed control arrangement including an eddy current brake comprising a rotor of electrically conductive material coupled to the rotatable member to be driven therewith, a magnetic circuit including a magnet and arranged to be coupled to the rotor such that rotation of the rotor causes eddy currents to be induced in the rotor material to produce a braking torque against its rotation and actuation means responsive to a change in driving torque applied to the rotatable member by the energy source to alter the coupling between the magnetic circuit and the rotor to produce a change in the braking torque on the rotor corresponding to the change in driving torque in which the magnetic circuit comprises a permanent magnet attached to a substantially U-shaped magnetic shunt member such that an air-gap exists between the limbs of the member and in which the rotor is a disc.

5. A speed control circuit as claimed in claim 3 in which the magnetic circuit is carried by an arm pivotable with respect to the rotor.

6. A speed control arrangement as claimed in claim 5 in which the arm is pivotable about the shaft of the gear of the train.

7. A speed control arrangement as claimed in claim 5 or claim 6 including a damper operable to prevent oscillation of the arm about its pivot point.

8. A speed control arrangement as claimed in claim 1 or claim 2 or claim 3 in which the energy source is a motor the rotor of the motor being coupled to the rotatable member and the actuation means comprising a connection between the magnetic circuit and the motor stator such that a reaction on the stator resulting from a change in motor torque causes a change in the magnetic coupling between the magnetic circuit and the eddy current rotor to effect a corresponding change in braking torque on the rotatable member.

9. A speed control arrangement for a rotatable member driven from an energy source the speed control arrangement including an eddy current brake comprising a rotor of electrically conductive material coupled to the rotatable member to be driven therewith, a magnetic circuit including a magnet and arranged to be coupled to the rotor such that rotation of the rotor causes eddy currents to be induced in the rotor material to produce a braking torque against its rotation and actuation means responsive to a change in driving torque applied to the rotatable member by the energy source to alter the coupling between the magnetic circuit and the rotor to produce a change in the braking torque on the rotor corresponding to the change in driving torque in which the eddy current brake includes a plurality of magnetic circuits movable relative to the rotor.

10. A speed control arrangement for a rotatable member driven from an energy source the speed control arrangement including an eddy current braking comprising a rotor of electrically conductive material coupled to the rotatable member to be driven therewith, a magnetic circuit including a magnet and arranged to be coupled to the rotor such that rotation of the rotor causes eddy currents to be induced in the rotor material to produce a braking torque against its rotation and actuation means responsive to a change in driving torque applied to the rotatable member by the energy source to alter the coupling between the magnetic circuit and the rotor to produce a change in the braking torque on the rotor corresponding to the change in driving torque including a plurality of magnetic circuits fixed relative to the rotor.

11. A speed control arrangement for a rotatable member driven from an energy source the speed control arrangement including an eddy current brake comprising a rotor of electrically conductive material coupled to the rotatable member to be driven therewith, a magnetic circuit including a magnet and arranged to be coupled to the rotor such that rotation of the rotor causes eddy currents to be induced in the rotor material to produce a braking torque against its rotation and actuation means responsive to a change in driving torque applied to the rotatable member by the energy source to alter the coupling between the magnetic circuit and the rotor to produce a change in the braking torque on the rotor corresponding to the change in driving torque in which the magnetic circuit comprises a permanent magnet attached to a substantially U-shaped magnetic shunt member such that an air-gap exists between the limbs of the member in which the shunt member of each magnetic circuit is shaped such that the relationship between braking torque and magnetic coupling varies in the same way as the relationship between the change of torque of the energy source and movement of the magnetic circuit.

12. A speed control arrangement as claimed in claim 4, in which the energy source is a spiral spring operable to unwind to apply a driving torque to the rotatable member by way of a gear train coupled to one end of the spring the actuation means comprising the other end of the spring connected to the magnetic circuit such that winding of the spring moves the magnetic circuit radially with respect to the rotor to increase the magnetic coupling with the rotor and unwinding of the spring causes moving of the magnetic circuit to decrease the coupling.

* * * * *